(12) United States Patent
Lee et al.

(10) Patent No.: US 9,507,177 B2
(45) Date of Patent: Nov. 29, 2016

(54) BACKLIGHT ASSEMBLY AND DISPLAY INCLUDING THE SAME

(71) Applicant: Samsung Display Co. Ltd., Yongin, Gyeonggi-Do (KR)

(72) Inventors: Sang Won Lee, Seoul (KR); Seong Yong Hwang, Asan-si (KR); Da Woon Kim, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 310 days.

(21) Appl. No.: 14/158,303

(22) Filed: Jan. 17, 2014

(65) Prior Publication Data

US 2015/0078033 A1    Mar. 19, 2015

(30) Foreign Application Priority Data

Sep. 16, 2013 (KR) .................. 10-2013-0111156

(51) Int. Cl.
| | |
|---|---|
| F21K 99/00 | (2016.01) |
| G02F 1/01 | (2006.01) |
| G02F 1/1335 | (2006.01) |
| G02B 6/00 | (2006.01) |

(52) U.S. Cl.
CPC . *G02F 1/01* (2013.01); *G02B 6/00* (2013.01); *G02F 1/133605* (2013.01); *G02F 1/133609* (2013.01)

(58) Field of Classification Search
CPC ............... G02F 1/01; G02F 1/133609; G02F 1/133605; G02B 6/00
See application file for complete search history.

(56) References Cited

U.S. PATENT DOCUMENTS

| | | | | |
|---|---|---|---|---|
| 8,890,905 | B2 * | 11/2014 | Kwong | ............ G02F 1/133605 345/690 |
| 2006/0139960 | A1 * | 6/2006 | Sakai | .................. G02B 6/0043 362/623 |
| 2012/0195065 | A1 | 8/2012 | Hyakuta et al. | |

FOREIGN PATENT DOCUMENTS

| | | |
|---|---|---|
| JP | 9-183920 A | 7/1997 |
| JP | 2010-205417 A | 9/2010 |
| JP | 2011-093112 A | 5/2011 |
| JP | 2013-008657 A | 1/2013 |
| JP | 2013-077538 A | 4/2013 |
| KR | 10-2005-0015669 A | 2/2005 |
| KR | 10-2005-0104787 A | 11/2005 |
| KR | 10-2006-0001181 A | 1/2006 |
| KR | 10-2012-0066322 A | 6/2012 |
| KR | 10-2012-0067550 A | 6/2012 |
| KR | 10-2012-0075115 A | 7/2012 |
| KR | 10-2012-0129092 A | 11/2012 |

* cited by examiner

*Primary Examiner* — Anabel Ton
(74) *Attorney, Agent, or Firm* — Knobbe, Martens, Olson & Bear, LLP

(57) ABSTRACT

A backlight assembly and a display including the same are disclosed. In one aspect, the backlight assembly includes a light source unit, a light guide plate including a light incident surface and a light facing surface formed on opposing ends thereof. The light incident surface receiving light irradiated from the light source surface. The backlight assembly also includes a first reflective member placed on the light facing surface and including a plurality of first color patterns facing the light facing surface.

21 Claims, 17 Drawing Sheets

711

711c

712

712c

714

714c

715

715c

BACKLIGHT ASSEMBLY AND DISPLAY INCLUDING THE SAME

CROSS-REFERENCE TO RELATED APPLICATIONS

This application is based on and claims priority from Korean Patent Application No. 10-2013-0111156, filed on Sep. 16, 2013 in the Korean Intellectual Property Office, the disclosure of which is incorporated herein in its entirety by reference.

BACKGROUND

Field

The described technology generally relates to a backlight assembly and a display including the same.

Description of the Related Technology

A display is a device that displays data. Examples of different display technologies include a liquid crystal display (LCD), an electrophoretic display, an organic light-emitting diode (OLED) display, an inorganic electroluminescent (EL) display, a field emission display, a surface-conduction electron-emitter display, a plasma display, or a cathode ray display.

The standard LCD includes a liquid crystal layer arranged between two transparent substrates. The light permeability for each pixel of the display can be adjusted based on the driving of the liquid crystal layer in order to display a desired image.

Since liquid crystals themselves are unable to emit light, a separate light source unit is installed in an LCD and the luminance of each pixel is selected by adjusting the strength of light passing through the liquid crystals installed in each pixel. The backlight assembly including a light source unit is an important component since it contributes to the picture quality, such as luminance and uniformity of the LCD.

The backlight assembly generally includes a light source, a reflective plate, a light guide plate, and various optical plates. Further, backlight assemblies can be classified into direct or edge type assemblies depending on the position of the light source unit. The standard direct type backlight assembly includes a light source unit that is arranged to face the lower surface of the light guide plate and the standard edge type backlight assembly includes a light source unit that is arranged to face the side surface of the light guide plate.

SUMMARY OF CERTAIN INVENTIVE ASPECTS

One inventive aspect is a backlight assembly which can reduce color deviation (or an attenuation of certain wavelengths of light) between a light incident portion and a light facing portion of a light guide plate.

Another aspect is a display including a backlight assembly which can reduce color deviation between a light incident portion and a light facing portion of a light guide plate.

Another aspect is a backlight assembly including a light source portion, a light guide plate including a light incident portion to which light irradiated from the light source portion is incident and a light facing portion that faces the light incident portion, and a first reflective member arranged on the light facing portion and including a plurality of first color patterns that face the light facing portion.

The first color patterns may be spaced apart from each other at a predetermined interval.

The first color patterns may be symmetrically arranged about a center axis of the light guide plate that is in parallel to the direction in which the light is incident.

The light source portion may comprise a plurality of light sources, and the first color patterns may respectively correspond to the light sources.

The color of the first color patterns may have a substantially complementary color relationship with the color of the light that is incident to the first reflective member.

The color of the first color patterns may be blue.

The first reflective member further includes a first base layer and a first adhesive layer arranged on the first base layer.

The first color patterns may be interposed between the first base layer and the first adhesive layer.

The first color patterns may be formed on one surface of the first base layer and the ratio of the area of the first color patterns to the area of the first base layer may be between about 10% to about 40%.

The light guide plate may further comprise a first side portion and a second side portion connecting the light incident portion to the light facing portion and facing each other, a support portion connecting the light incident portion and the light facing portion to each other, and an emission portion formed over and opposing the support portion and connecting the light incident portion and the light facing portion to each other, wherein the light irradiated from the light source portion may be emitted through the emission portion.

The backlight assembly may further comprise a second reflective member arranged on the first side portion and including a second base layer and a second adhesive layer arranged on the second base layer and a third reflective member arranged on the second side portion and including a third base layer and a third adhesive layer arranged on the third base layer, wherein the second reflective member and the third reflective member may be symmetrical about a center axis of the light guide plate that is in parallel to a direction in which the light is incident.

The second reflective member may further include a plurality of second color patterns interposed between the second base layer and the second adhesive layer, the third reflective member may further include a plurality of third color patterns interposed between the third base layer and the third adhesive layer, and the colors of the second color patterns and the third color patterns may be the same as the color of the first color patterns.

The widths of the first color patterns may increase with a decreasing distance to the center of the first reflective member.

The distance between the adjacent first color patterns may decrease with decreasing distance to the center of the first reflective member.

The widths of the second and third color patterns may increase with an increasing distance from the light source portion.

The distance between the adjacent second and third color patterns may decrease with an increasing distance from the light source portion.

Another aspect is a backlight assembly comprising a light source, a light guide plate including a light incident portion to which light irradiated from the light source is incident and a light facing portion that faces the light incident portion, and a reflective member arranged on the light facing portion, wherein the reflective member includes at least one color pattern, and the color of the color pattern has a substantially complementary color relationship with the color of the light that is incident to the reflective member.

The color of the color pattern may be blue.

The reflective member may further comprise a base layer and an adhesive layer arranged on the base layer and the color pattern may be interposed between the base layer and the adhesive layer.

The color pattern may be fixed onto the light guide plate by the medium of the adhesive layer.

Another aspect is a display comprising a display panel and a backlight assembly arranged on a lower portion of the display panel, wherein the backlight assembly include a light source portion, a light guide plate including a light incident portion to which light irradiated from the light source portion is incident and a light facing portion that faces the light incident portion, and a reflective member arranged on the light facing portion and including a plurality of color patterns that face the light facing portion.

The color patterns may be substantially evenly spaced apart from each other. The color of the color patterns may be selected such that when light reflected from the color patterns mixes with light reflected from the reflective member the color of the mixed light is white. The color patterns may be more closely spaced near the center of the reflective member.

According to at least one embodiment of the described technology, the following effects can be achieved.

The color deviation between the light incident portion and the light facing portion of the light guide plate can be reduced.

Further, light having substantially the same color can be emitted over the entire emission surface of the light guide plate.

The effects of the described technology are not limited to above description, but further various effects are included in the detailed description as set forth below.

DETAILED DESCRIPTION OF CERTAIN INVENTIVE EMBODIMENTS

Figure 1:
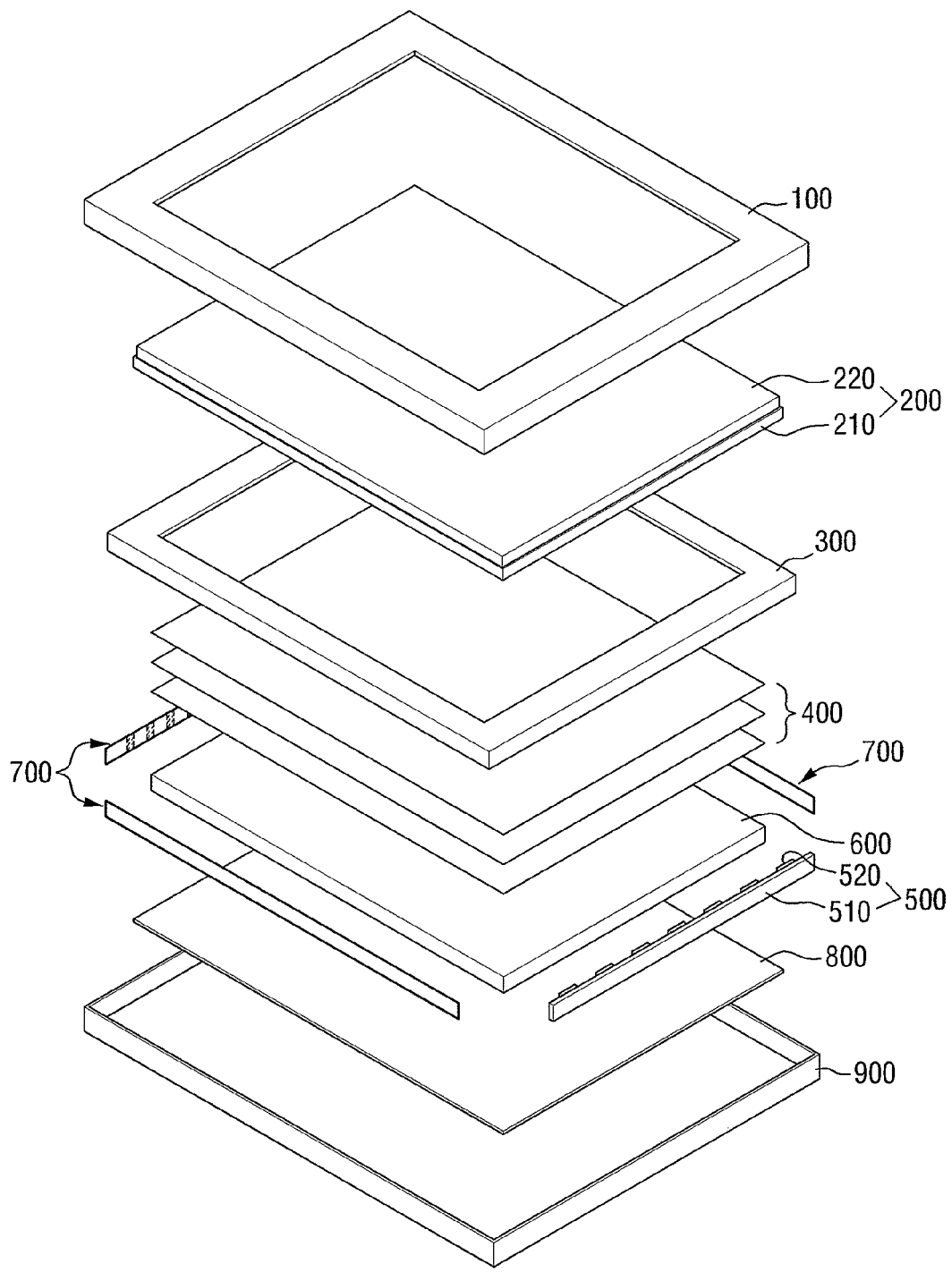
FIG. 1 is an exploded perspective view of a display according to an embodiment.

Recently, due to increased demand for slim LCDs, edge type backlight assemblies are more commonly used than direct type backlight assemblies. However, since the light guide plate typically used in edge type backlight assemblies has a thin plate shape and a light source unit is arranged at an edge of the light guide plate, the distance light travels though the light guide plate when emitted from the light source unit is comparatively lengthened. In particular, where the light source unit is arranged on only one side surface of the light guide plate, the light emitted from the light guide must travel from the side surface to the opposing side surface of the light guide plate, and thus, the distance traveled is lengthened.

The light guide plate can be made of a transparent material to guide the light emitted from the light guide to the liquid crystal layer. In this case, although it is ideal that the light emitted from the light source unit is transferred to the liquid crystal layer without being changed, the light guide plate may absorb certain wavelengths of light due to the material of the light guide plate. For example, if the light guide plate is made of polymethyl-methacrylate (PMMA), the light guide plate may absorb light having short-wavelengths.

As described above, if the distance the light travels in the light guide plate is comparatively lengthened, the amount of light having the specific wavelengths absorbed by the light guide plate increases. Accordingly, the color of the light in the light guide plate can change from white to yellow as it travels from a light incident portion to a light facing portion of the light guide plate. Accordingly, by attaching a reflective tape having a blue pigment surface-printed thereon to the light facing portion of the light guide plate, the light facing portion absorbs the yellow light, and thus, color deviation (or a comparative attenuation in certain wavelengths of light) between the light incident portion and the light facing portion of the light guide plate can be reduced.

However, even if a specific color pigment is surface-printed on the reflective tape that is arranged on the light facing portion of the light guide plate, it can be difficult to obtain the desired reduction in color deviation. For example, although the color coordinates of the light that is emitted from the light facing portion of the light guide plate is improved, the color of light emitted from the light guide may be perceived as bluish. This is because the change of the color coordinates of the light is abruptly changed over a short distance when reflected from the reflective tape on the light facing portion of the light guide plate. Additionally, this is also because a portion of the blue light reflected from the reflective tape on the light facing portion of the light guide plate is not totally reflected to the light guide plate, but is directly emitted out of the light guide plate.

Another method for reducing the color deviation between the light incident portion and the light facing portion of the light guide plate can include placing ink, in which two or more pigments are mixed, on the light facing portion of the light guide plate. For example, a sky-blue or violet pigment can be surface-printed on the reflective tape.

However, even if the reflective tape including surface printed ink with two or more mixed pigments is used, it is difficult to obtain the desired color deviation reduction. That is, not only it is difficult to adjust the mixing ratio of two or more pigments but also it is difficult to satisfy the desired color coordinates, that is, both the x-color coordinate and y-color coordinate.

Advantages and features of the described technology and methods of accomplishing the same may be understood more readily by reference to the following detailed description and the accompanying drawings. The described technology may, however, be embodied in many different forms and should not be construed as being limited to the embodiments set forth herein. Rather, these embodiments are provided so that this disclosure will be thorough and complete and will fully convey the concept of the described technology to those skilled in the art and the described technology will only be defined by the appended claims. Thus, in some embodiments, well-known structures and devices are not shown in order not to obscure the description of the described technology with unnecessary detail. Like numbers refer to like elements throughout. In the drawings, the thickness of layers and regions may be exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the described technology. Accordingly, the exemplary views may be modified depending on manufacturing technologies and/or tolerances. Therefore, the embodiments of the described technology are not limited to those shown in the views, but include modifications in the configurations formed on the basis of manufacturing processes. Therefore, regions exemplified in figures have schematic properties and the shapes of the only exemplify the specific shapes of elements and do not limit the described technology.

Hereinafter, embodiments of the described technology will be described with reference to the accompanying drawings.

FIG. 1 is an exploded perspective view of a display according to an embodiment. Referring to FIG. 1, a display includes a display panel 200 and a backlight assembly. According to some embodiments, the display further includes a top chassis 100 and a bottom chassis 900.

The display panel 200 is a panel that displays data. The display panel 200 may be a liquid crystal display (LCD) panel, an electrophoretic display panel, an organic light-emitting diode (OLED) display panel, a light emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. Hereinafter, an LCD including an LCD panel is exemplified. However, the display and the display panel according to the described technology are not limited thereto, and various types of displays and display panels may be used.

The display panel 200 may include a display region where an image can be displayed and a non-display region where images are not displayed. Further, the display panel 200 may include a first substrate 210, a second substrate 220 that faces the first substrate 210, and a liquid crystal layer (not illustrated) interposed between the first substrate 210 and the second substrate 220.

The first and second substrates 210 and 220 may have a substantially cuboid shape. For convenience of explanation, FIG. 1 illustrates the and second substrates 210 and 220 having a cuboid shape. However, the shapes of the first and second substrates 220 are not limited thereto.

The liquid crystal layer is interposed between the first and second substrates 210 and 220. According to some embodiments, a sealing member, such as a sealant, is arranged between the first and second substrates 210 and 220 and is arranged along border portions of the first and second substrates 120 and 220 to attach and seal the first and the second substrates 210 and 220 to each other.

Although not illustrated in FIG. 1, the display panel 200 may include a driving portion and a flexible circuit board, which are attached to the first substrate 210 or the second substrate 220. The driving portion may apply various signals, such as driving signals required to display an image on the display region. The flexible circuit board may output various kinds of signals to the driving portion.

The backlight assembly may be arranged on a lower portion of the display panel 200. The backlight assembly may provide light to the display panel 200. The details of the backlight assembly will be described later.

The top chassis 100 may cover the border of the display panel 200 and may surround the side surfaces of the backlight assembly. The bottom chassis 900 may accommodate the backlight assembly. The top and bottom chassis 100 and 900 may be engaged with each other to surround the display panel 200 and the backlight assembly. The top and bottom chassis 100 and 900 may be made of a conductive material, for example, a metal.

Figure 2:
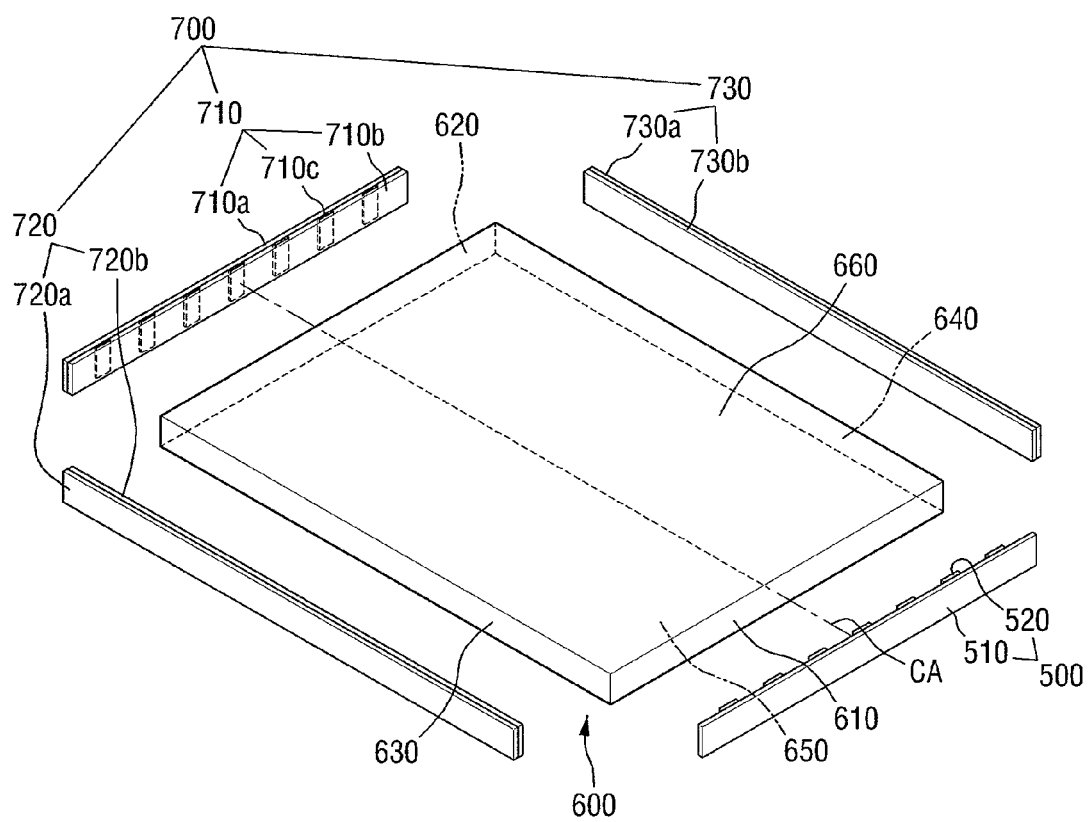
FIG. 2 is an exploded perspective view of the backlight assembly of the display of FIG. 1.
Figure 3:
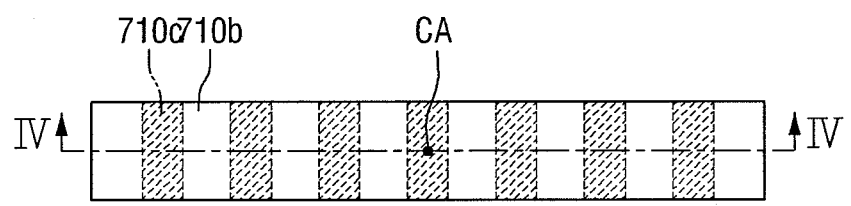
FIG. 3 is a plan view of the first reflective member of the backlight assembly of FIG. 2.

Hereinafter, the backlight assembly according to an embodiment will be described with reference to FIGS. 2 to 4. Here, the backlight assembly is a backlight assembly that is included in the display of FIG. 1. FIG. 2 is an exploded perspective view of the backlight assembly of the display of FIG. 1. FIG. 3 is a plan view of the first reflective member 710 of the backlight assembly of FIG. 2 and FIG. 4 is a cross-sectional view cut along line IV-IV of FIG. 3.

Figure 4:
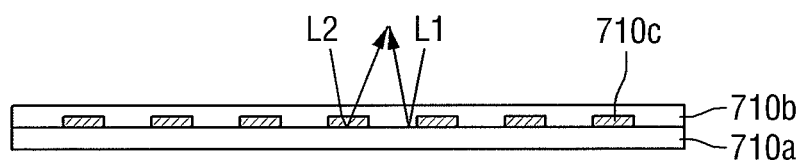
FIG. 4 is a cross-sectional view cut along line IV-IV of FIG. 3.

Referring to FIGS. 2 to 4, the backlight assembly includes a light source portion (or light source unit) 500, a light guide plate 600, and a reflective member 700. The backlight assembly further includes an optical sheet 400, a reflective plate 800, and a mold frame 300.

The light source portion 500 generates light and irradiates the generated light onto the light guide plate 600. The light guide 500 is arranged on one side surface of the light guide plate 600, that is, on a light incident portion (or light incident surface) 610. In some embodiments, the light source portion 500 is arranged to correspond to a short side of the light guide plate 600, but is not limited thereto. The light source portion 500 may be arranged to correspond to a long side of the light guide plate 600.

The light source portion 500 includes a circuit board 510 and a plurality of light sources 520 arranged on the circuit board 510.

The circuit board 510 is place adjacent to the light incident portion 610. The circuit board 510 may be connected to a power supply (not illustrated) to transfer electric energy to the light sources 520. The shape of the surface of the circuit board 510 that faces the light incident portion 610 of the light guide plate 600 may correspond to the shape of the light incident portion 610. In some embodiments, one surface of the circuit board 510 is substantially parallel to the light incident portion 610 of the light guide plate 600. Further, the area of one surface of the circuit board 510 may be substantially equal to that of the light incident portion 610.

The light sources 520 are arranged on one surface of the circuit board 510. The light sources 520 convert the electric energy received from the circuit board 510 into light. The light sources 520 may be arranged to be spaced apart from each other at a predetermined interval. Further, the light sources 520 may be arranged in a line. In some embodiments, the light sources 520 are light-emitting diodes (LEDs). In these cases, the light sources 520 are white LEDs that emit white light; however, the described technology is not limited thereto. The light sources 520 may be red, green, or blue LEDs. Further, the light sources 52 may include two or more different kinds of LEDs. In the embodiment illustrated in FIGS. 1 and 2, the surface of the circuit board 510 that contacts the light sources is substantially parallel to the light incident portion 610; however, the described technology is not limited thereto. The surface of the circuit board 50 that contacts the light sources 520 may be substantially perpendicular to the light incident portion 610. That is, the light source portion 500 may have a side emitting structure. In this case, a separate reflective film for guiding the light emitted from the light source 520 in the direction of the light incident portion 610 may be formed on the light source 520.

The light guide plate 600 may be positioned on a side portion of the light source portion 500. That is, the light guide plate 600 may be positioned in substantially the same plane as the light source portion 500. The light guide plate 600 may guide light irradiated from the light source portion 500 and transfer the light to the display panel 200.

The light guide plate 600 may be made of a transparent material. In some embodiments, the light guide plate 600 is made of polymethyl-methacrylate (PMMA), but is not limited thereto. The light guide plate 600 may be made of various transparent materials that can guide light. Further, the light guide plate 600 may be made of a rigid material, but is not limited thereto. The light guide plate 600 may be made of a flexible material.

The light guide plate 600 may have a plate shape. In the description, the light guide plate 600 is exemplified as having a substantially plate shape, but is not limited thereto. The light guide plate 600 may have various other shapes.

The light guide plate 600 includes the light incident portion 610 and a light facing portion (or light facing surface) 620. The light guide plate 600 may further include a first side portion (or first side surface) 630, a second side portion (or second side surface) 640, a support portion (or support surface) 650, and an emission portion (or emission surface) 660.

Light irradiated from the light source portion 500 is incident on the light incident portion 610. The light incident portion 610 may be one of several side surfaces of the light guide plate 600. The light incident portion 610 may be a side surface that corresponds to a short side of the light guide plate 600, but is not limited thereto. The light incident portion 610 may be a side surface that corresponds to a long side of the light guide plate 600.

The light facing portion 620 may be a portion that faces the light incident portion 610 in the light guide plate 600. The light facing portion 620 may be one of several side surfaces of the light guide plate 600. The light facing portion 620 may be a side surface of the light guide plate 600 where light irradiated from the light source portion 500 is incident to and reflected from. That is, the light facing portion 620 may be the side surface of the light guide plate 600 that is farthest apart from the light source portion 500.

The first and second side portions 630 and 640 may connect the light incident portion 610 and the light facing portion 620 to each other. Further, the first and second side portions 630 and 640 may oppose each other. In this case, the first and second side portions 630 and 640 are substantially parallel to each other. Further, the first and second side portions 630 and 640 may be symmetrical about the center of the light guide plate 600.

The support portion 650 may connect the light incident portion 610 and the light facing portion 620 to each other. Further, the support portion 650 may connect the first and second side portions 630 and 640 to each other. The support portion 650 may be the lower surface of the light guide plate 600. The support portion 650 may support the light guide plate 600 and other constituent elements on the upper side of the light guide plate 600.

The emission portion 660 may connect the light incident portion 610 and the light facing portion 620 to each other. Further, the emission portion 660 may connect the first and second side portions 630 and 640 to each other. The emission portion 660 may be the upper surface of the light guide plate 600. The light irradiated from the light source portion 500 to the light guide plate 600 may be emitted through the emission portion 660 of the light guide plate 600 and may be transferred to the display panel 200.

The reflective member 700 may be arranged on the side surfaces of the light guide plate 600 on which the light source portion 500 is not positioned. That is, the reflective member 700 may be arranged on the light facing portion 620 and the first and second side portions 630 and 640 of the light guide plate 600 and not on the light incident portion 610 of the light guide plate 600. The reflective member 700 may prevent the light that is emitted from the light source portion 500 and is incident to the inside of the light guide plate 600 from escaping to the environment through the side surfaces of the light guide plate 600. That is, the reflective member 700 may redirect the light incident on the reflective member 700 towards the emission portion 660 of the light guide plate 600.

The reflective member 700 may include a first reflective member 710, a second reflective member 720, and a third reflective member 730.

The first reflective member 710 may be positioned on the light facing portion 620 of the light guide plate 600. The first reflective member 710 may be arranged to face the light facing portion 620 of the light guide plate 600. Further, the first reflective member 710 may be substantially parallel to the light facing portion 620 of the light guide plate 600. The shape of the first reflective member 710 may correspond to that of the light facing portion 620. For example, the area of the first reflective member 710 may be substantially equal to the area of the light facing portion 620. Further, the extended length of the first reflective member 710 may be substantially equal to the extended length of the light facing portion 620. In some embodiments, the first reflective member 710 and the light facing portion 620 may completely overlap each other.

The first reflective member 710 may include a first base layer 710*a*, a first adhesive layer 710*b*, and a first color pattern 710*c*.

The first base layer 710*a* may include a reflective material. In some embodiments, the first base layer 710*a* includes a metal material. In other embodiments, the first base layer 710a is formed of a polymer layer coated with a reflective material. The first base layer 710a may have diffuse or specular reflective properties.

In some embodiments, the first base layer 710a is formed of a rigid material, but is not limited thereto. The first base layer 710a may be formed of a flexible material. In some embodiments, the light guide plate 600 is formed of a rigid material and the first base layer 710a is also foamed of a rigid material. In other embodiments, the light guide plate 600 is formed of a flexible material and the first base layer 710a is also formed of a flexible material.

The first adhesive layer 710b is positioned on the first base layer 710a. Specifically, the first adhesive layer 710b is positioned on the surface of the first base layer 710a that faces the light facing portion 620 of the light guide plate 600. The first adhesive layer 710b may substantially overlap the first base layer 710a.

The first adhesive layer 710b may be made of at least one of heat curing adhesives, catalyst added adhesives, moisture cure adhesives, anaerobic adhesives, hot melt adhesives, dehumidifier adhesives, optically clear adhesives, or pressure sensitive adhesives. In some embodiments, the first adhesive layer 710b is made of optically clear adhesives (OCA). Here, the optically clear adhesives may be transparent and may be semi-solid. In general, since the shape a semi-solid material is easily controlled, the treatment of semi-solid optical transparent adhesives may be easier than that of liquid resin.

The first adhesive layer 710b may come in direct contact with the light facing portion 620 of the light guide plate 600. That is, the first adhesive layer 710b may be attached to the light facing portion 620 of the light guide plate 600 to fix the light guide plate 600 and the first reflective member 710 to each other. Since the refractive index of the first adhesive layer 710b may be substantially equal to that of the light guide plate 600, substantially no refraction of light occurs at the interface between the first adhesive layer 710b and the light guide plate 600.

The first color pattern 710c may be interposed between the first base layer 710a and the first adhesive layer 710b. Specifically, the first color pattern 710c may be completely surrounded by the first base layer 710a and the first adhesive layer 710b. In some embodiments, the first reflective member 710 is formed by completely covering the first color pattern 710c with the first adhesive layer 710b after forming the first color pattern 710c on the first base layer 710a. Here, since the first color pattern 710c has a thickness less than that the first adhesive layer 710b, the first color pattern 710c may be completely covered by the first adhesive layer 710b. In other words, the first color pattern 710c may be firmly fixed by the first base layer 710a and the first adhesive layer 710b.

The first color pattern 710c may be formed on the surface of the first base layer 710a that faces the light facing portion 620 of the light guide plate 600. That is, light irradiated from the light source portion 500 may be incident to the first color pattern 710c through the light guide plate 600 and the first adhesive layer 710b.

A plurality of first color patterns 710c may be provided. The first color patterns 710c may be arranged to be spaced apart from each other at a predetermined interval. Further, the first color patterns 710c may be arranged in a line. In the embodiment illustrated in FIGS. 2 to 4, the first color patterns 710c have a stripe shape and are arranged in a line to be spaced apart from each other at a predetermined interval along the direction in which the first base layer 710a is extended. Here, the first color patterns 710c are arranged parallel to each other. Further, the widths of the first color patterns 710c may be substantially equal to each other. The widths of the first color patterns 710c refers to the widths of the first color patterns 710c extending in the same direction in which the first base layer 710a extends.

The first color patterns 710c may be symmetrically arranged based on a center axis CA of the light guide plate 600 that is parallel to the direction in which the light irradiated from the light source portion 500 is incident to the light guide plate 600. That is, as illustrated in FIG. 3, the first color patterns 710c are arranged to have point symmetry about the center axis CA of the light guide plate 600. Further, the first color patterns 710c may respectively correspond to the light sources 520 included in the light source portion 500. For example, the number of first color patterns 710c may be equal to the number of light sources 520. Further, the first color patterns 710c may be arranged to respectively face the light sources 520. That is, the first color patterns 710c and light sources 529 may be correspondingly arranged on the same plane, but the described technology is not limited thereto. The first color patterns 710c may be arranged corresponding to the portions of the circuit board 510 exposed between the light sources 520.

The first color patterns 710c may include a pigment having a specific color. According to some embodiments, the first color patterns 710c include a blue pigment, but they are not limited thereto. In this case, the first color patterns 710c include about 2 weight percent (wt. %) to about 30 wt. % of the blue pigment with respect to a solvent. Here, if the first color patterns 710c include about 2 wt. % or more of the blue pigment, the color coordinates of the light incident to the first color patterns 710c can be easily changed. According to some embodiments, the first color patterns 710c may include about 10 wt. % of the blue pigment.

The light that is incident to the first color patterns 710c may be reflected from the surfaces of the first color patterns 710c and may be transferred in the direction of the light guide plate 600. Further, the light that is incident to the first color patterns 710c may pass through the first color patterns 710c and may be incident to a surface of the first base layer 710a. Then, the incident light is reflected from the surface of the first base layer 710a and is transferred again in the direction of the light guide plate 600.

The color of the first color patterns 710c may have a substantially complementary color relationship with the color of light incident to the first reflective member 710. According to some embodiments, the light that is incident to the first reflective member 710 is yellow and the color of the first color pattern 710c is blue. According to other embodiments, the light that is incident to the first reflective member 710 is red and the color of the first color pattern 710c is green.

The ratio of the area of the first color patterns 710c to the area of the first base layer 710a may be between about 10% to about 40%. That is, the area of the first color patterns 710c that covers the surface of the first base layer 710a may be between about 1/10 to about 4/10 of the area of the first base layer 710a. According to some embodiments, the ratio of the area of first color patterns 710c to the area of the surface of the first base layer 710a is about 30%.

The thickness of the first color patterns 710c may be between about 2 μm to 10 about μm. Specifically, the thickness of the first color pattern 710c may be about 5 μm, but is not limited thereto. Here, the thickness of the first color pattern 710c refers to the distance that the first color pattern 710c protrudes from the surface of the first base layer 710a.

The second reflective member 720 may be arranged on the first side portion 630 of the light guide plate 600. The second reflective member 720 may be arranged to face the first side portion 630 of the light guide plate 600. Further, the second reflective member 720 may be parallel to the first side portion 630 of the light guide plate 600. The shape of the second reflective member 720 may correspond to that of the first side portion 630 of the light guide plate 600. According to some embodiments, the second reflective member 720 and the first side portion 630 may completely overlap each other.

The second reflective member 720 may include a second base layer 720a and a second adhesive layer 720b.

The second base layer 720a may include a reflective material. Further, the second base layer 720a may be made of a rigid material, but is not limited thereto. The second base layer 720a may be made of a flexible material. Further, the second base layer 720a may be made of the same material as the first base layer 710a.

The second adhesive layer 720b may be formed on the second base layer 720a. Specifically, the second adhesive layer 720b may be located on the surface of the second base layer 720a that faces the first side portion 630 of the light guide plate 600. The second adhesive layer 720b may substantially overlap the second base layer 720a.

The second adhesive layer 720b may be formed of at least one of heat curing adhesives, catalyst added adhesives, moisture cure adhesives, anaerobic adhesives, hot melt adhesives, dehumidifier adhesives, optically clear adhesives, or pressure sensitive adhesives. Further, the second adhesive layer 720b may be made of the same material as the first adhesive layer 710b.

The second adhesive layer 720b may come in direct contact with the first side portion 630 of the light guide plate 600. That is, the second adhesive layer 720b may be attached to the first side portion 630 of the light guide plate 600 to fix the light guide plate 600 and the second reflective member 720.

The third reflective member 730 may be arranged on the second side portion 640 of the light guide plate 600. The third reflective member 730 may be arranged to face the second side portion 640 of the light guide plate 600. Further, the third reflective member 730 may be parallel to the second side portion 640 of the light guide plate 600. Further, the shape of the third reflective member 730 may correspond to that of the second side portion 640 of the light guide plate 600. According to some embodiments, the third reflective member 730 and the second side portion 640 may completely overlap each other.

The third reflective member 730 may include a third base layer 730a and a third adhesive layer 730b.

The third base layer 730a may include a reflective material. Further, the third base layer 730a may be made of a rigid material, but is not limited thereto. The third base layer 730a may be made of a flexible material. Further, the third base layer 730a may be made of the same material as the first base layer 710a.

The third adhesive layer 730b may be positioned on the third base layer 730a. Specifically, the third adhesive layer 730b may be positioned on the surface of the third base layer 730a that faces the second side portion 640 of the light guide plate 600. The third adhesive layer 730b may completely overlap the third base layer 730a.

The third adhesive layer 730b may be formed of at least one of heat curing adhesives, catalyst added adhesives, moisture cure adhesives, anaerobic adhesives, hot melt adhesives, dehumidifier adhesives, optically clear adhesives, or pressure sensitive adhesives. Further, the third adhesive layer 730b may be made of the same material as the first adhesive layer 710b.

The third adhesive layer 730b may come in direct contact with the second side portion 640 of the light guide plate 600. That is, the third adhesive layer 730b may be attached to the second side portion 640 of the light guide plate 600 to fix the light guide plate 600 and the third reflective member 730.

The second reflective member 720 and the third reflective member 730 may be symmetrically arranged about the center axis CA of the light guide plate 600 that is parallel to the direction in which the light irradiated from the light source portion 500 is incident to the light guide plate 600. Further, the second reflective member 720 and the third reflective member 730 may be parallel to each other. Further, the second adhesive layer 720b of the second reflection member 720 and the third adhesive layer 730b of the third reflective member 730 may face each other.

The light source portion 500, the first reflective member 710, the second reflective member 720, and the third reflective member 730 surround the side surface of the light guide plate 600 to prevent light that is irradiated into the light guide plate 600 from escaping to the environment through the side surface of the light guide plate 600.

The optical sheet 400 may be arranged on the upper portion of the light guide plate 600. The optical sheet 400 may modulate the optical characteristics of the light that is emitted through the emission portion 660 of the light guide plate 600. A plurality of optical sheets 400 may be laminated overlapping each other for mutual supplementation thereof.

The reflective plate 800 may be arranged on the lower side of the light guide plate 600. The reflective plate 800 may reflect light incident the support portion 650.

The mold frame 300 may be interposed between the display panel 200 and the optical sheet 400. The mold frame 300 may be engaged with the bottom chassis 900 to fix the optical sheet 400, the light source portion 500, the light guide plate 600, the reflective member 700, and the reflective plate 800. Further, the mold frame 300 may come in contact with the border portion of the display panel 200 to support and fix the display panel 200.

Figure 5:
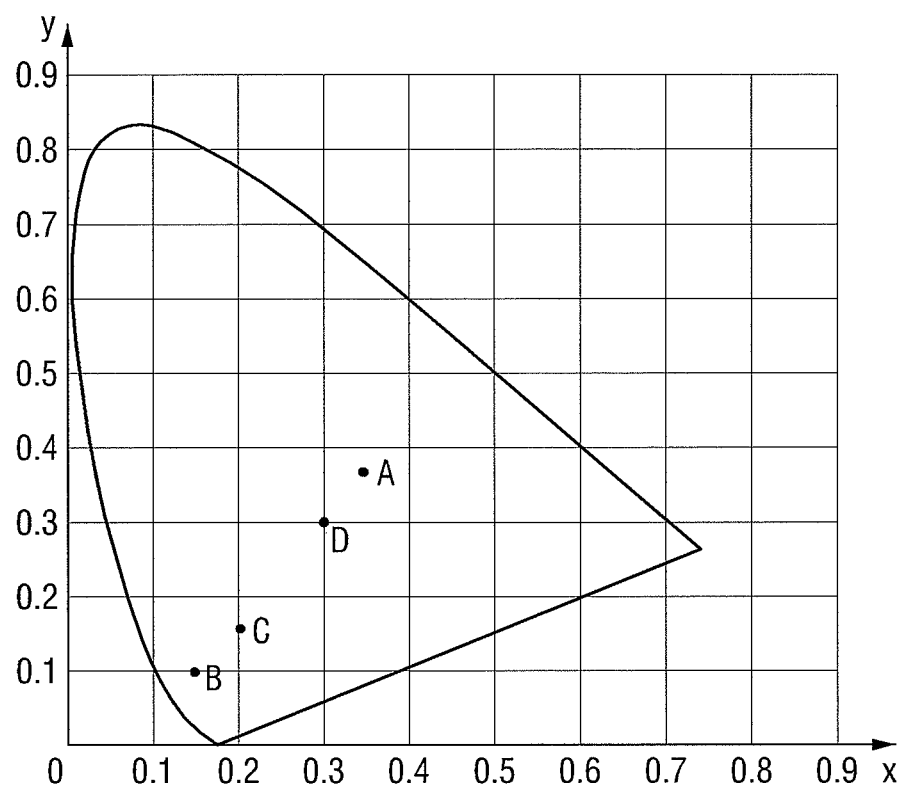
FIG. 5 is a graph illustrating color coordinates according to the position of light that is reflected by the first reflective member of the backlight assembly of FIG. 2.
Figure 6:
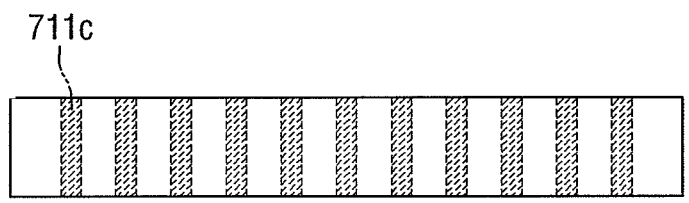
FIGS. 6 to 11 are plan views of first reflective members of backlight assemblies according to other embodiments.
Figure 7:
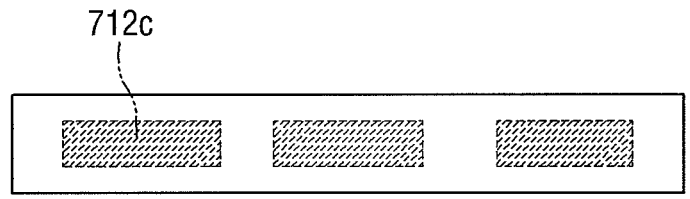
Figure 8:
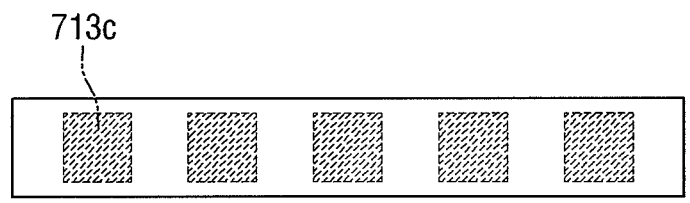
Figure 9:
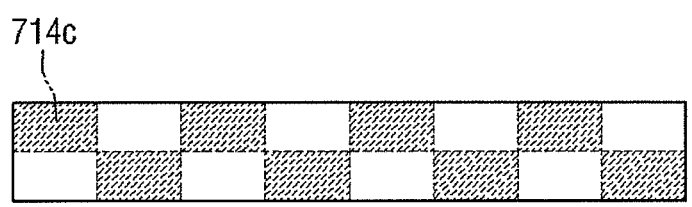
Figure 10:
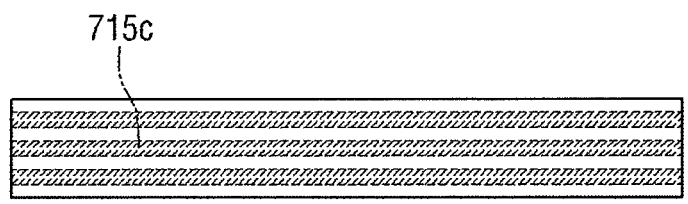
Figure 11:
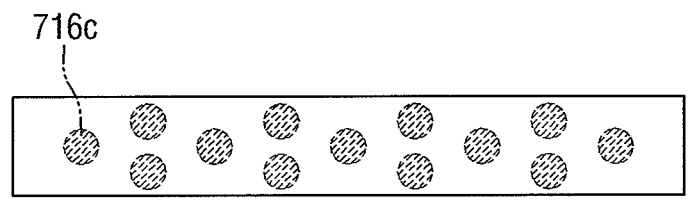

Hereinafter, referring to FIGS. 4 and 5, the mechanism of the described technology according to at least one embodiment that compensates for color deviation of the light guide plate 600 in the backlight assembly will be described. As described above, FIG. 4 is a cross-sectional view of the first reflective member 710. FIG. 5 is a graph illustrating color coordinates according to the position of light that is reflected by a first reflective member 710 of the backlight assembly of FIG. 2.

Referring to FIGS. 4 and 5, light that is emitted from the light source portion 500 and is incident to the first reflective member 710 through the light guide plate 600 can be classified into two situations. The first is light L1 that is directly reflected by the first base layer 710a without passing through the first color pattern 710c and the second is light L2 that is incident to the first color pattern 710c and is reflected by the first color pattern 710c or the first base layer 710a. Here, if the light source portion 500 emits white light and the light guide plate 600 is made of polymethyl-methacrylate (PMMA), the colors of the first and second lights L1 and L2 before being reflected by the first base layer 710a may be yellow. That is, the color coordinates of L1 and L2 before being reflected by the first base layer 710a is represented by "A" in FIG. 5. That is, although the color of the light that is incident to the light incident portion 610 of the light guide plate 600 is white, the color of the light becomes yellow as the light passes through the light guide plate 600. That is, a deviation in the color of light traveling through the light guide plate 600 occurs between the light incident portion 610 and the color facing portion 620.

L1 that is reflected by the first base layer 710a may remain yellow. According to some embodiments, although the color of L1 that is reflected by the first base layer 710a may be changed due to the influence of the first base layer 710a, it is assumed that the color of L1 is not changed for convenience of explanation. That is, the color coordinates of L1 that is reflected by the first base layer 710a remains "A" in FIG. 5.

The color coordinates of the first color pattern 710c may be "B" in FIG. 5. The color coordinates of L2 that is incident to the first color pattern 710c and then is reflected may be changed from "A" to "C". That is, the color of L2 that is reflected may be blue.

As described above, L1 and L2, which are reflected by the first base layer 710a, may be mixed with each other to represent white. That is, the colors of L1 and L2 that are reflected have a complementary color relationship with each other. Thus, when L1 and L2 are mixed with each other, their colors are also mixed to become white. In this case, the color coordinates of the light, in which L1 and L2 are mixed with each other, may be "D" in FIG. 5. The color coordinates "D" in FIG. 5 may be the target color coordinates.

As described above, due to the backlight assembly, as the light that is incident to the first reflective member 710, that is, the light having a deviation in color coordinates, is reflected by the first reflection member 710, the color coordinates thereof may be naturally improved. Thus, by pattern-printing the pigment of the color that has a substantially complementary color relationship with the color of the light that is incident to the first reflective member 710 rather than surface-printing over the entire surface thereof, the color coordinates can be prevented from being abruptly changed in the vicinity of the light facing portion 620 of the light guide plate 600. Further, even if the light that is reflected by the first reflective member 710 is not surface-reflected in the light guide plate 600 but is directly emitted, the colors thereof are directly mixed to represent a mixed color, and thus the phenomenon that a specific color is recognized only in the light facing portion 620 of the light guide plate 600 can be prevented from occurring. Further, since only the ratio of the area of the first color patterns 710c to the area of the surface of the first base layer 710a can be adjusted, the processing cost and the number of processed can be reduced.

Hereinafter, first reflective members 711 to 716 according to other embodiments will be described with reference to FIGS. 6 to 11. FIGS. 6 to 11 are plan views of first reflective members 711 to 716 of backlight assemblies. For convenience of explanation, the same reference numerals are used for elements that are substantially the same as the respective elements illustrated in the drawings as described above, and the duplicate explanations thereof will be omitted.

As illustrated in FIGS. 6 to 11, the first color patterns 711c to 716c of the first reflective members 711 to 716 may have various shapes. First, referring to FIG. 6, the first color patterns 711c of the first reflective member 711 may have a stripe shape similar to that the above-described embodiment, but the widths of the first color patterns 711c may be less than those of the above-described embodiment. Accordingly, the number of first color patterns 711c may be increased such that the total area thereof is similar to that of the previous embodiment. Next, referring to FIG. 7, the first color patterns 712c of the first reflective member 712 may have a rectangular shape. Next, referring to FIG. 8, the color patterns 713c of the first reflective member 713 may have a square shape. Next, referring to FIG. 9, the first color patterns 714c of the first reflective member 714 may be arranged in a checkered arrangement. In other words, the first color patterns 714c may have a paduk board (or chessboard) arrangement. Next, referring to FIG. 10, the first color patterns 715c of the first reflective member 715 may be striped in the horizontal direction. That is, the first reflective member 715 may include the first color patterns 715c in having a stripe shape that is parallel to the direction in which the first reflective member 715 is extended. Next, referring to FIG. 11, the first color patterns 716c of the first reflective member 716 may include a plurality of circular patterns.

As described above, the first reflective members 711 to 716 of the backlight assembly may include first color patterns 711c to 716c having various shapes.

Figure 12:
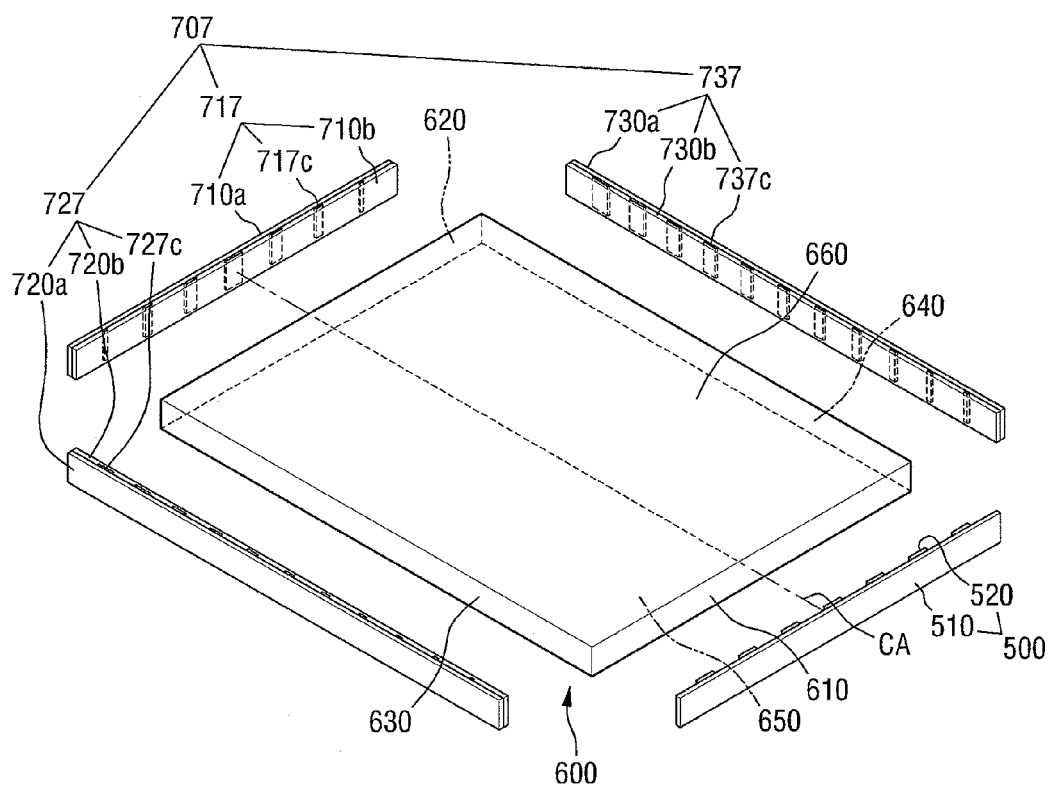
FIG. 12 is an exploded perspective view of a backlight assembly according to yet another embodiment.
Figure 13:
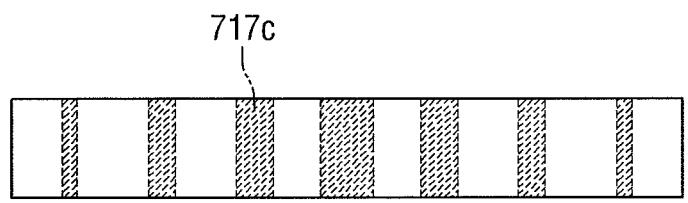
FIG. 13 is a plan view of the first reflective member of the backlight assembly of FIG. 12.
Figure 14:
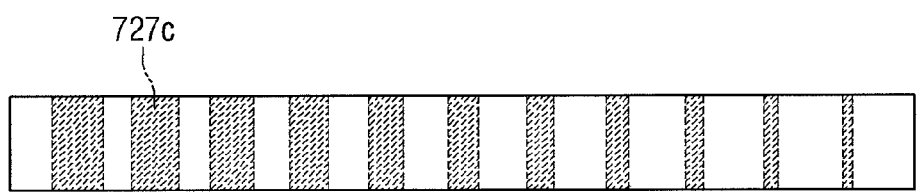
FIG. 14 is a plan view of the second reflective member of the backlight assembly of FIG. 12.

Hereinafter, a backlight assembly according to yet another embodiment will be described with reference to FIGS. 12 to 14. FIG. 12 is an exploded perspective view of a backlight assembly according to another embodiment. FIG. 13 is a plan view of the first reflective member 717 of the backlight assembly of FIG. 12 and FIG. 14 is a plan view of the second reflective member 727 of the backlight assembly of FIG. 12. For convenience in explanation, the same reference numerals are used for elements that are substantially the same as the respective elements illustrated in the drawings as described above and the duplicate explanation thereof will be omitted.

Referring to FIGS. 12 to 14, a reflective member 707 of a backlight assembly according an embodiment includes a first reflective member 717, a second reflective member 727, and a third reflective member 737.

The first reflective member 717 includes a first base layer 710a, a first adhesive layer 710b, and a plurality of first color patterns 717c. Here, since the first base layer 710a and the first adhesive layer 710b are the same as those as described above, the same reference numerals are given thereto.

The widths of the first color patterns 717c increase with a decreasing distance to the center of the first reflective member 717. Here, the space between the centers of the adjacent first color patterns 717c may be constant. Specifically, the width of the first color pattern 717c that is positioned on the center axis CA of the light guide plate 600 may be the largest and the width of the first color patterns 717c that are the farthest from the center axis CA of the light guide plate 600 may be smallest.

The second reflective member 727 may include a second base layer 720a, a second adhesive layer 720b, and second color patterns 727c. Here, since the second base layer 720a and the second adhesive layer 720b are the same as those as described above, the same reference numerals are given thereto.

The second color patterns 727c are interposed between the second base layer 720a and the second adhesive layer 720b. The second color patterns 727c are completely surrounded by the second base layer 720a and the second adhesive layer 720b. The process of forming the second color patterns 727c may be substantially the same as the process of forming the first color patterns 717c.

The color of the second color patterns 727c is the same as that of the first color patterns 717c. According to some embodiments, the color of the first and second color patterns 717c and 727c is blue.

The second color patterns 727c are formed on the surface of the second base layer 720a that faces the first side portion 630 of the light guide plate 600. That is, the light irradiated from the light source portion 500 may pass through the first side portion 630 of the light guide plate 600 and may be incident to the second color patterns 727c.

The second color patterns 727c are arranged to be spaced apart from each other at a predetermined distance. Further, the widths of the second color patterns 727c increase with an increasing distance from the light source portion 500. Here, the gap between the centers of the adjacent second color patterns 727c may be constant. Specifically, the width of the second color pattern 727c that is the farthest from the light source portion 500 may be the largest and the width of the second color pattern 727c that is the closest to the light source portion 500 may be the smallest.

The third reflective member 737 may include a third base layer 730a, a third adhesive layer 730b, and third color patterns 737c. Here, since the third base layer 730a and the third adhesive layer 730b are the same as those as described above, the same reference numerals are given thereto.

The third color patterns 737c are interposed between the third base layer 730a and the third adhesive layer 730b. The third color patterns 737c are completely surrounded by the third base layer 730a and the third adhesive layer 730b. The process of forming the third color patterns 737c may be substantially the same as the process of forming the first color patterns 717c.

The color of the third color patterns 737c may be the same as that of the first color pattern 717c. According to some embodiments, the color of the first and third color patterns 717c and 737c is blue.

The third color patterns 737c are formed on the surface of the third base layer 730a that faces the second side portion 640 of the light guide plate 600. That is, the light irradiated from the light source portion 500 may pass through the second side portion 640 of the light guide plate 600 and may be incident to the third color patterns 737c.

The third color patterns 737c may be arranged to be spaced apart from each other for a predetermined distance. Further, the widths of the third color patterns 737c increase with an increasing distance from the light source portion 500. Here, the space between the centers of the adjacent third color patterns 737c may be constant. Specifically, the width of the third color pattern 737c that is the farthest from the light source portion 500 may be the largest and the width of the third color pattern 737c that is the closest to the light source portion 500 may be the smallest.

The second and third color patterns 727c and 737c may face each other and may be symmetrical about the center axis CA of the light guide plate 600.

Figure 15:
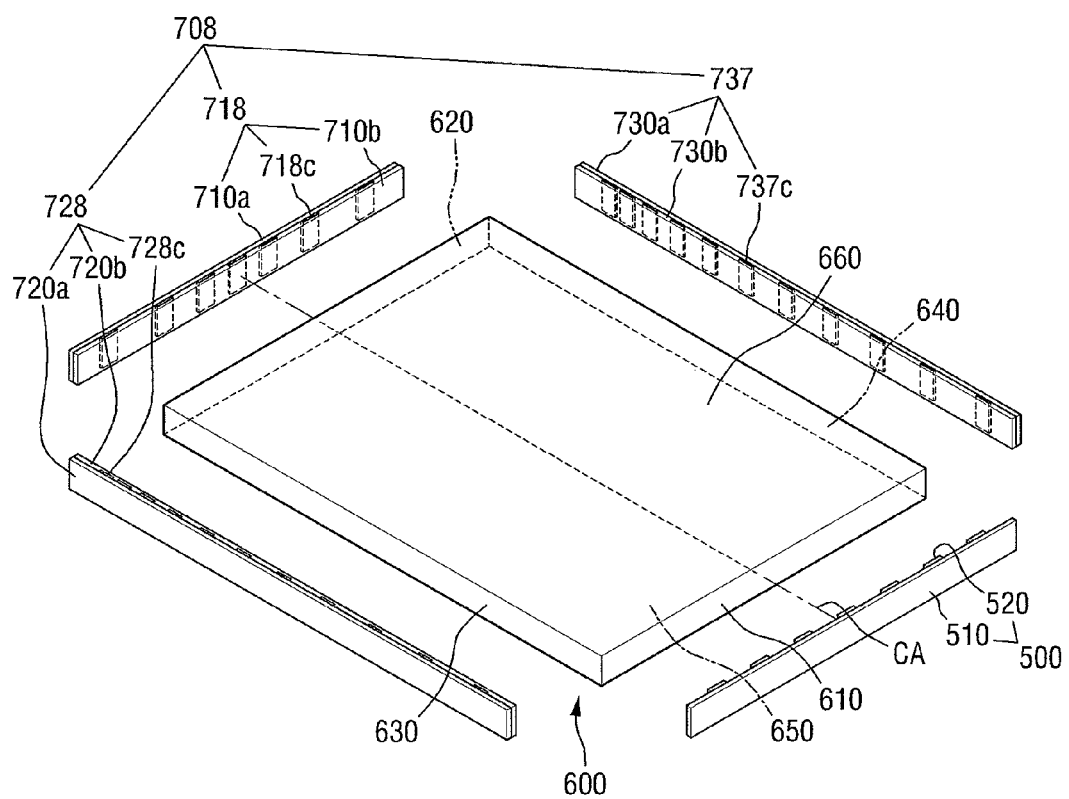
FIG. 15 is an exploded perspective view of a backlight assembly according to still yet another embodiment.
Figure 16:
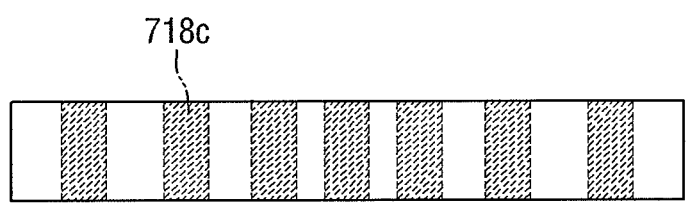
FIG. 16 is a plan view of the first reflective member of the backlight assembly of FIG. 15.
Figure 17:
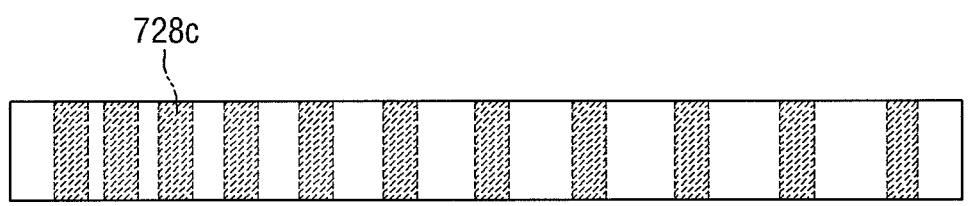
FIG. 17 is a plan view of the second reflective member of the backlight assembly of FIG. 15.

Hereinafter, a backlight assembly according to still yet another embodiment will be described with reference to FIGS. 15 to 17. FIG. 15 is an exploded perspective view of a backlight assembly according to an embodiment. FIG. 16 is a plan view of the first reflective member 718 of the backlight assembly of FIG. 15 and FIG. 17 is a plan view of the second reflective member 728 of the backlight assembly of FIG. 15. For convenience in explanation, the same reference numerals are used for elements that are substantially the same as the respective elements illustrated in the drawings as described above and duplicate explanation thereof will be omitted.

Referring to FIGS. 15 to 17, a reflective member 708 of a backlight assembly according to an embodiment includes a first reflective member 718, a second reflective member 728, and a third reflective member 738.

The first reflective member 718 includes a first base layer 710a, a first adhesive layer 710b, and a plurality of first color patterns 718c. Here, since the first base layer 710a and the first adhesive layer 710b are the same as those as described above, the same reference numerals are given thereto.

The distance between the adjacent first color patterns 718c decreases with a decreasing distance to the center of the first reflective member 718. Here, the widths of the first color patterns 718c may be constant. Specifically, the density of the first color patterns 718c may be greater near the center of the first reflective member 718 and the first color patterns 718c may be spaced apart from each other at the end portion of the first reflective member 718.

The second reflective member 728 may include a second base layer 720a, a second adhesive layer 720b, and second color patterns 728c. Here, since the second base layer 720a and the second adhesive layer 720b are the same as those as described above, the same reference numerals are given thereto.

The distance between the adjacent second color patterns 728c decreases with an increasing distance from the light source portion 500. Here, the widths of the second color patterns 728c may be constant. Specifically, the density of the second color patterns 728c may be greater in a portion that is far apart from the light source portion 500 and the second color patterns 728c may be spaced far apart from each other in a portion that is adjacent to the light source portion 500.

The third reflective member 738 includes a third base layer 730a, a third adhesive layer 730b, and third color patterns 738c. Here, since the third base layer 730a and the third adhesive layer 730b are the same as those as described above, the same reference numerals are given thereto.

The distance between the adjacent third color patterns 718c decreased with an increasing distance from the light source portion 500. Here, the widths of the third color patterns 738c may be constant. Specifically, the density of the third color patterns 738c may be greater in a portion that is far apart from the light source portion 500 and the third color patterns 738c may be spaced far apart from each other in a portion that is adjacent to the light source portion 500.

According to the embodiments illustrated in FIGS. 12 to 17, color deviation can be compensated for not only in the light facing portion 620 of the light guide plate 600 but also in the first and second side portions 630 and 640 of the light guide plate 600. That is, the light emitted from the light source portion 500 is transferred from the light incident portion 610 of the light guide plate 600 to not only the light facing portion 620 but also the first and second side portions 630 and 640 of the light guide plate 600, and thus, color correction may also be necessary in the first and second side portions 630 and 640. In this case, since the color change of the light that is emitted from the light source portion 500 is not severe near the light source portion 500, a large number of second and third color patterns 727c, 728c, 737c and 738c may not be necessary. In contrast, since the color change of the light that is emitted from the light source portion 500 is more prominent in the portion that is far apart from the light source portion 500, a large number of second and third color patterns 727c, 728c, 737c and 738c may be necessary. Accordingly, by properly adjusting the shapes and the arrangements of the second and third color patterns 727c, 728c, 737c and 738c, the color correction in the respective areas of the light guide plate 600 can be optimized.

Further, in the first reflective members 717 and 718 that are adjacent to the second and third reflective members 727, 728, 737 and 738, that is, in the opposing end portions of the first reflective members 717 and 718, the color deviation correction is performed by the second and third reflective members 727, 728, 737 and 738, and thus a large number of first color patterns 717c and 718c may not be necessary. Accordingly, by properly adjusting the shapes and the arrangements of the first color patterns 717c and 718c, the color correction in the respective areas near the first reflective members 717 and 718 can be optimized.

Although preferred embodiments of the described technology have been described for illustrative purposes, those skilled in the art will appreciate that various modifications, additions and substitutions are possible, without departing from the scope and spirit of the invention as disclosed in the accompanying claims.

What is claimed is:

1. A backlight assembly for a display device, comprising:
a light source unit configured to generate light;
a light guide plate including a light incident surface and a light facing surface formed on opposing ends thereof, wherein the light incident surface is configured to receive the generated light; and
a first reflective member placed on the light facing surface and including a plurality of first color patterns facing the light facing surface,
wherein the first reflective member further comprises a first base layer and a first adhesive layer formed on the first base layer, and
wherein the first color patterns are interposed between the first base layer and the first adhesive layer.

2. The backlight assembly of claim 1, wherein the first color patterns are substantially evenly spaced apart from each other.

3. The backlight assembly of claim 1, wherein the first color patterns are substantially symmetrically arranged about a center axis of the light guide plate.

4. The backlight assembly of claim 1, wherein the light source unit comprises a plurality of light sources and wherein the first color patterns substantially directly face the light sources, respectively.

5. The backlight assembly of claim 1, wherein the color of the first color patterns is selected such that when light reflected from the first color patterns mixes with light reflected from the first reflective member the color of the mixed light is white.

6. The backlight assembly of claim 1, wherein the color of the first color patterns is blue.

7. The backlight assembly of claim 1, wherein the ratio of the area of the first color patterns to the area of the first base layer is between about 10% to about 40%.

8. The backlight assembly of claim 1, wherein the light guide plate further comprises:
first and second side surfaces opposing each other, wherein the first and second side surfaces are formed between the light incident surface and the light facing surface;
a support surface formed between the light incident surface and the light facing surface; and
a light output surface formed over and opposing the support surface, wherein the light output surface is: i) formed between the light incident surface and the light facing surface and ii) configured to output the generated light,
wherein the light guide plate is configured to emit the light received from the light source unit through the emission surface.

9. The backlight assembly of claim 8, further comprising:
a second reflective member placed on the first side surface of the light guide plate, wherein the second reflective member includes a second base layer and a second adhesive layer formed on the second base layer; and
a third reflective member placed on the second side surface of the light guide plate, wherein the third reflective member includes a third base layer and a third adhesive layer formed on the third base layer,
wherein the second and third reflective members are substantially symmetrical about a center axis of the light guide plate.

10. The backlight assembly of claim 9, wherein the second reflective member further includes a plurality of second color patterns interposed between the second base layer and the second adhesive layer, wherein the third reflective member further includes a plurality of third color patterns interposed between the third base layer and the third adhesive layer, and wherein the colors of the second and third color patterns are the same as that of the first color patterns.

11. The backlight assembly of claim 10, wherein the first reflective member and the first color patterns extend in a first direction and wherein the widths of the first color patterns measured in the first direction increase as the distance to the center of the first reflective member decreases.

12. The backlight assembly of claim 10, wherein the first reflective member and the first color patterns extend in a first direction and wherein the distance between the adjacent first color patterns decreases with as the distance to the center of the first reflective member decreases.

13. The backlight assembly of claim 10, wherein the second and third reflective members and the second and third color patterns extend in a second direction and wherein the widths of the second and third color patterns measured in the second direction increase as the distance from the light source unit increases.

14. The backlight assembly of claim 10, wherein the second and third reflective members and the second and third color patterns extend along a second direction and wherein the distances between the adjacent second and third color patterns decreases as the distance from the light source unit increases.

15. A backlight assembly for a display device, comprising:
a light source configured to generate light;
a light guide plate including a light incident surface and a light facing surface formed on opposing ends thereof, wherein the light incident surface is configured to receive the generated light; and
a reflective member placed on the light facing surface,
wherein the reflective member includes at least one color pattern,
wherein the color of the color pattern is selected such that when light reflected from the first color pattern mixes with light reflected from the reflective member the color of the mixed light is white, and
wherein the ratio of the area of the color pattern to the area of the reflective member is between about 10% to about 40%.

16. The backlight assembly of claim 15, wherein the color of the color pattern is blue.

17. The backlight assembly of claim 15, wherein the reflective member further comprises a base layer and an adhesive layer formed on the base layer and wherein the color pattern is interposed between the base layer and the adhesive layer.

18. A display, comprising:
a display panel; and
a backlight assembly configured to provide light to the display panel,
wherein the backlight assembly includes:

a light source configured to generate light;

a light guide plate including a light incident surface and a light facing surface formed on opposing ends thereof, wherein the light incident surface is configured to receive the generated light; and a reflective member placed on the light facing surface and including a plurality of color patterns facing the light facing surface, wherein the reflective member further comprises a base layer and a adhesive layer formed on the base layer, and wherein the color patterns are interposed between the base layer and the adhesive layer.

19. The display of claim 18, wherein the color patterns are substantially evenly spaced apart from each other.

20. The display of claim 18, wherein the color of the color patterns selected such that when light reflected from the color patterns mixes with light reflected from the reflective member the color of the mixed light is white.

21. The display of claim 18, wherein the color patterns are more closely spaced near the center of the reflective member.

\* \* \* \* \*